（12）United States Patent
Ito

(10) Patent No.: US 8,616,645 B2
(45) Date of Patent: Dec. 31, 2013

(54) SEAT LIFTER DEVICE

(75) Inventor: Sadao Ito, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/819,826

(22) PCT Filed: Sep. 14, 2011

(86) PCT No.: PCT/JP2011/071019
§ 371 (c)(1),
(2), (4) Date: Feb. 28, 2013

(87) PCT Pub. No.: WO2012/036212
PCT Pub. Date: Mar. 22, 2012

(65) Prior Publication Data
US 2013/0161989 A1    Jun. 27, 2013

(30) Foreign Application Priority Data

Sep. 17, 2010 (JP) ................................. 2010 209784

(51) Int. Cl.
*B60N 2/12* (2006.01)
(52) U.S. Cl.
USPC ................................. 297/344.17; 297/344.15
(58) Field of Classification Search
USPC ........................... 297/344.15, 344.16, 344.17
See application file for complete search history.

(56) References Cited

U.S. PATENT DOCUMENTS

| 4,787,594 | A |   | 11/1988 | Ikegaya et al. |            |
|-----------|---|---|---------|----------------|------------|
| 5,593,209 | A | * | 1/1997  | Bauer et al.   | 297/344.15 X |
| 5,709,364 | A | * | 1/1998  | Araki et al.   | 297/344.17 X |
| 5,979,985 | A | * | 11/1999 | Bauer et al.   | 297/344.15 X |
| 6,095,475 | A | * | 8/2000  | Willms et al.  | 297/344.15 X |
| 6,347,778 | B1 | * | 2/2002 | Koga et al.    | 297/344.17 X |
| 6,488,337 | B1 | * | 12/2002 | De Voss et al. | 297/344.15 X |

(Continued)

FOREIGN PATENT DOCUMENTS

DE          19754962       5/1999
DE       10 2008 006 019   10/2008

(Continued)

OTHER PUBLICATIONS

International Search Report Issued Dec. 13, 2011 in PCT/JP11/071019 Filed Sep. 14, 2011.

(Continued)

*Primary Examiner* — Rodney B White
(74) *Attorney, Agent, or Firm* — Oblon, Spivak, McClelland, Maier & Neustadt, L.L.P.

(57) ABSTRACT

A seat lifter device includes a seat support member; a front link rotationally coupled to a front section of the seat support member; a rear link rotationally coupled to a rear section of the seat support member; a frame member including a front section rotationally coupled to the front link and a rear section rotationally coupled to the rear link at a position rearward of the coupling portion between the seat support member and the rear link; a cushion member including a front section rotationally coupled to the frame member and a rear section rotationally coupled to the rear link at a position further separated from the coupling portion between the seat support member and the rear link than the coupling portion between the rear link and the frame member; and a rotation transmitting member for rotating one of the front link and the rear link.

6 Claims, 6 Drawing Sheets

(56) References Cited

U.S. PATENT DOCUMENTS

| | | | |
|---|---|---|---|
| 6,517,157 B1 * | 2/2003 | Vorac | 297/344.17 X |
| 6,843,460 B2 * | 1/2005 | Koga et al. | 297/344.17 X |
| 6,851,753 B2 * | 2/2005 | Akaike et al. | 297/344.17 |
| 7,066,540 B2 * | 6/2006 | Minai et al. | 297/344.15 |
| 7,413,252 B2 * | 8/2008 | Kim et al. | 297/344.15 |
| 7,631,939 B2 * | 12/2009 | Wulf et al. | 297/344.17 X |
| 7,703,851 B2 * | 4/2010 | Nakaya et al. | 297/344.15 |
| 7,717,509 B2 * | 5/2010 | Kojima | 297/344.15 X |
| 7,766,427 B2 * | 8/2010 | Kojima et al. | 297/344.15 |
| 7,770,863 B2 * | 8/2010 | Yamada et al. | 297/344.15 X |
| 7,828,384 B2 * | 11/2010 | Shinozaki | 297/344.15 |
| 7,861,994 B2 * | 1/2011 | Yamada et al. | 297/344.15 X |
| 7,984,950 B2 * | 7/2011 | Hoshi et al. | 297/344.15 X |
| 8,096,617 B2 * | 1/2012 | McCulloch et al. | 297/344.15 |
| 8,177,280 B2 * | 5/2012 | Yamada et al. | 297/344.17 X |
| 8,353,558 B2 * | 1/2013 | Okamoto et al. | 297/344.15 X |
| 8,366,194 B2 * | 2/2013 | Yamamoto | 297/344.15 X |
| 2003/0227204 A1 * | 12/2003 | Akaike et al. | 297/344.15 X |
| 2004/0066077 A1 * | 4/2004 | Petry | 297/344.15 X |
| 2007/0284922 A1 | 12/2007 | Matsuhashi | |
| 2008/0048477 A1 | 2/2008 | Ujimoto et al. | |
| 2009/0218868 A1 * | 9/2009 | Koga et al. | 297/344.17 |
| 2010/0253110 A1 | 10/2010 | Yamada et al. | |

FOREIGN PATENT DOCUMENTS

| | | |
|---|---|---|
| JP | 62 129013 | 6/1987 |
| JP | 6 37152 | 5/1994 |
| JP | 7 32250 | 7/1995 |
| JP | 2002 225600 | 8/2002 |
| JP | 2006 15116 | 1/2006 |
| JP | 2008 24282 | 2/2008 |
| JP | 2008 49848 | 3/2008 |
| JP | 2009 29185 | 2/2009 |

OTHER PUBLICATIONS

Supplemental European Search Report, Sep. 12, 2013.

* cited by examiner

SEAT LIFTER DEVICE

FIELD OF THE INVENTION

The present invention relates to a seat lifter device that adjusts the vertical position of a seat cushion.

BACKGROUND OF THE INVENTION

Some of the seats of a vehicle such as the front seats include, for example, a seat lifter device, which allows a seat occupant to adjust the vertical position of a seat cushion in accordance with the size of the seat occupant to obtain a desired eye level. Conventionally, various types of such seat lifter devices have been proposed. For example, a seat lifter device disclosed in Patent Document 1 includes lifter mechanisms, which are mounted on base plates on upper rails. The lifter mechanisms adjust the vertical position of the seat cushion. Brackets are fixed on the base plates, and a seat back is fixed on the brackets via reclining mechanisms. According to this seat lifter device, only the seat cushion moves vertically with respect to the base plates and the seat back.

In a seat lifter device disclosed in Patent Document 2, the seat cushion is supported on lower frames via front links and rear links that form quadric crank chains. The front links and the rear links adjust the vertical position of the seat cushion. The seat back is fixed on the seat cushion via the reclining mechanisms. According to this seat lifter device, unlike the device of Patent Document 1, the seat cushion and the seat back integrally move up and down.

PRIOR ART DOCUMENT

Patent Document

Patent Document 1: Japanese Laid-Open Patent Publication No. 62-129013

Patent Document 2: Japanese Laid-Open Patent Publication No. 2002-225600

SUMMARY OF THE INVENTION

In general, a seat back has an S-curve that corresponds to an S-curve of the back of an average sized seat occupant. In the seat lifter device of Patent Document 1, when an average sized (height) seat occupant adjusts the vertical position of the seat cushion to obtain a desired eye level, the S-curve of the back of the seat occupant corresponds to that of the seat back within a certain range. However, when a small or large person, that is, a person having a smaller or taller height than the average adjusts the vertical position of the seat cushion to adjust the eye level, the S-curve of the back of the seat occupant and the S-curve of the seat back might be displaced significantly.

In the seat lifter device of Patent Document 2, the seat cushion and the seat back integrally move up and down. Thus, the S-curve of the back of a large or small person and the S-curve of the seat back might remain displaced from each other. Furthermore, load applied to the seat back by, for example, a collision is applied to the quadric crank chains formed by the front links and the rear links. Therefore, it is necessary to increase the thickness and the width of the front links and the rear links to ensure the strength. In particular, in the case in which the length of the front links and the rear links is increased in order to increase the vertical adjustment amount of the seat cushion that can be adjusted by the quadric crank chains, it is necessary to further ensure the strength and the rigidity of the links. In addition, when the seat cushion moves upward by adjustment of the vertical position, the seat back moves upward accordingly. Thus, the space between the headrest retained at the upper end of the seat back and the ceiling is decreased.

Accordingly, it is an objective of the present invention to provide a seat lifter device that allows the position of an eye level of a seat occupant to be adjusted while reducing a displacement between an S-curve of the back of the seat occupant and an S-curve of a seat back.

To achieve the foregoing objectives and in accordance with one aspect of the present invention, a seat lifter device is provided that includes a seat support member, a front link, a rear link, a frame member, a cushion member, and a rotation transmitting member. The front link includes first and second ends. The first end is rotationally coupled to a front section of the seat support member. The rear link includes first and second ends. The first end is rotationally coupled to a rear section of the seat support member. The frame member includes a front section rotationally coupled to the second end of the front link and a rear section rotationally coupled to the second end of the rear link at a position rearward of the coupling portion between the seat support member and the rear link. A seat back is supported at a rear end portion of the frame member. The cushion member includes part of a seat cushion. The cushion member also includes a front section rotationally coupled to the frame member and a rear section rotationally coupled to the rear link at a position further separated from the coupling portion between the seat support member and the rear link than the coupling portion between the rear link and the frame member. The rotation transmitting member rotates one of the front link and the rear link.

DETAILED DESCRIPTION OF THE PREFERRED EMBODIMENTS

First Embodiment

A first embodiment of the present invention will now be described with reference to the drawings.

Figure 1:
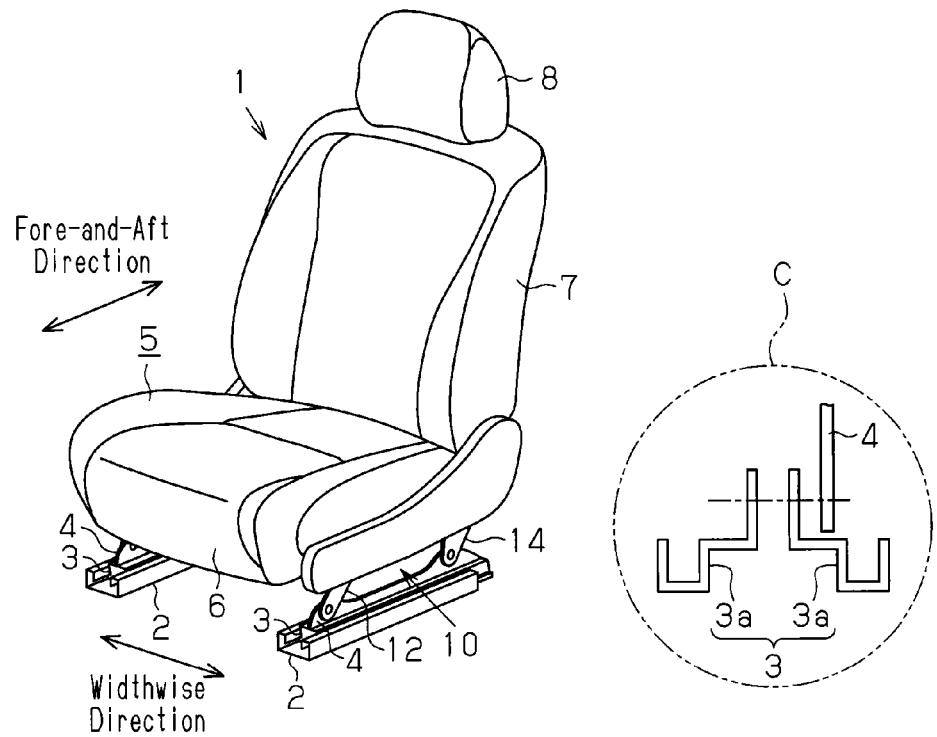
FIG. 1 is a perspective view illustrating a vehicle seat to which a seat lifter device according to a first embodiment of the present invention is applied.

FIG. 1 is a perspective view showing a seat 1, which is a front seat of a vehicle such as an automobile. As shown in FIG. 1, a pair of lower rails 2, which face each other in the widthwise direction of the seat 1 and extend in the fore-andaft direction, is fixed on a vehicle floor F (see FIG. 4). An upper rail 3 is mounted on each of the lower rails 2 to be movable relative to the associated lower rail 2. The pair of lower rails 2 and the pair of upper rails 3 form a slide mechanism.

A plate-like bracket 4 (a seat support member), which extends upward, is coupled to each of the upper rails 3. More specifically, as shown by a transverse sectional view in circle C in FIG. 1, each upper rail 3 includes a pair of members 3a, which is formed by bending plate materials that face each other. The pair of members 3a is symmetrical. Each bracket 4 is fastened to a vertical wall formed at the center of the corresponding upper rail 3 with, for example, a bolt and a nut or a swage pin. A seat main body 5 is secured to and supported by the brackets 4 via a lifter mechanism 10. The seat main body 5 includes a seat cushion 6, a seat back 7, which is tiltably (rotationally) supported at the rear end portion of the seat cushion 6, and a headrest 8, which is supported at the upper end portion of the seat back 7. The fore-and-aft position of the seat main body 5 is adjustable by the slide mechanism, and the vertical position of the seat main body 5 is adjustable by the lifter mechanism 10. Thus, a seat occupant of the seat main body 5 adjusts the vertical position of the seat main body 5 in accordance with the size of the seat occupant, for example, to obtain a desired eye level.

The configuration of the lifter mechanism 10 and the surrounding section will further be described.

Figure 2:
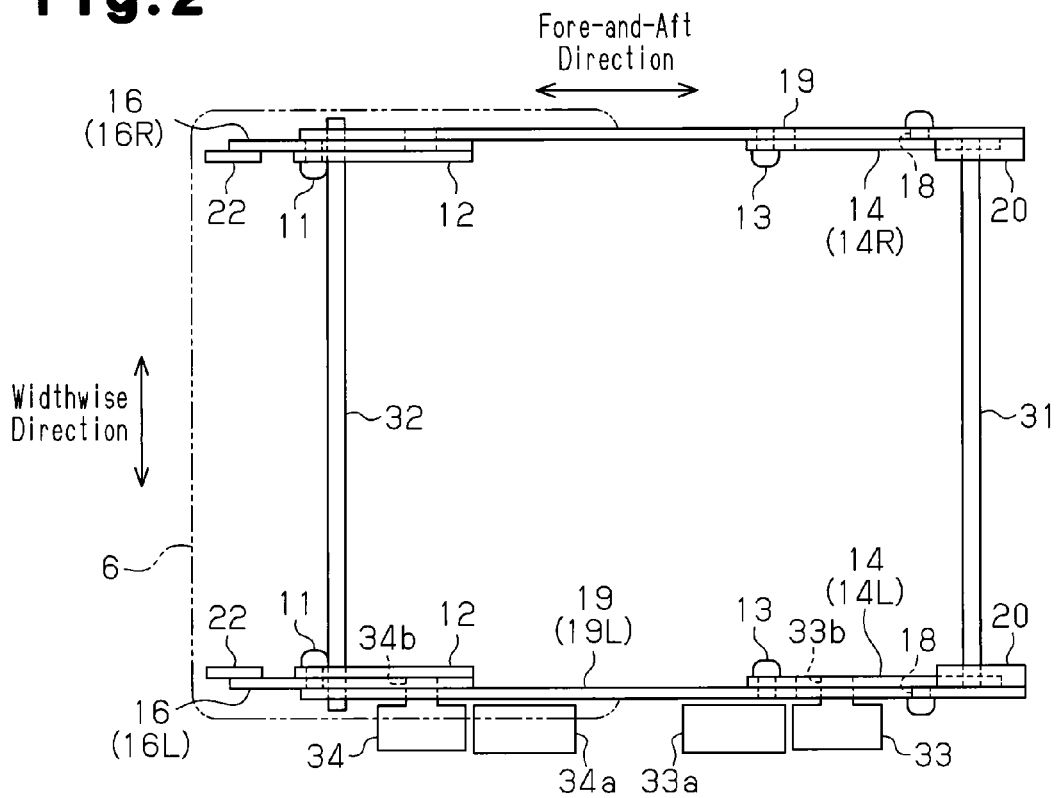
FIG. 2 is a plan view illustrating the seat lifter device of FIG. 1.
Figure 3:
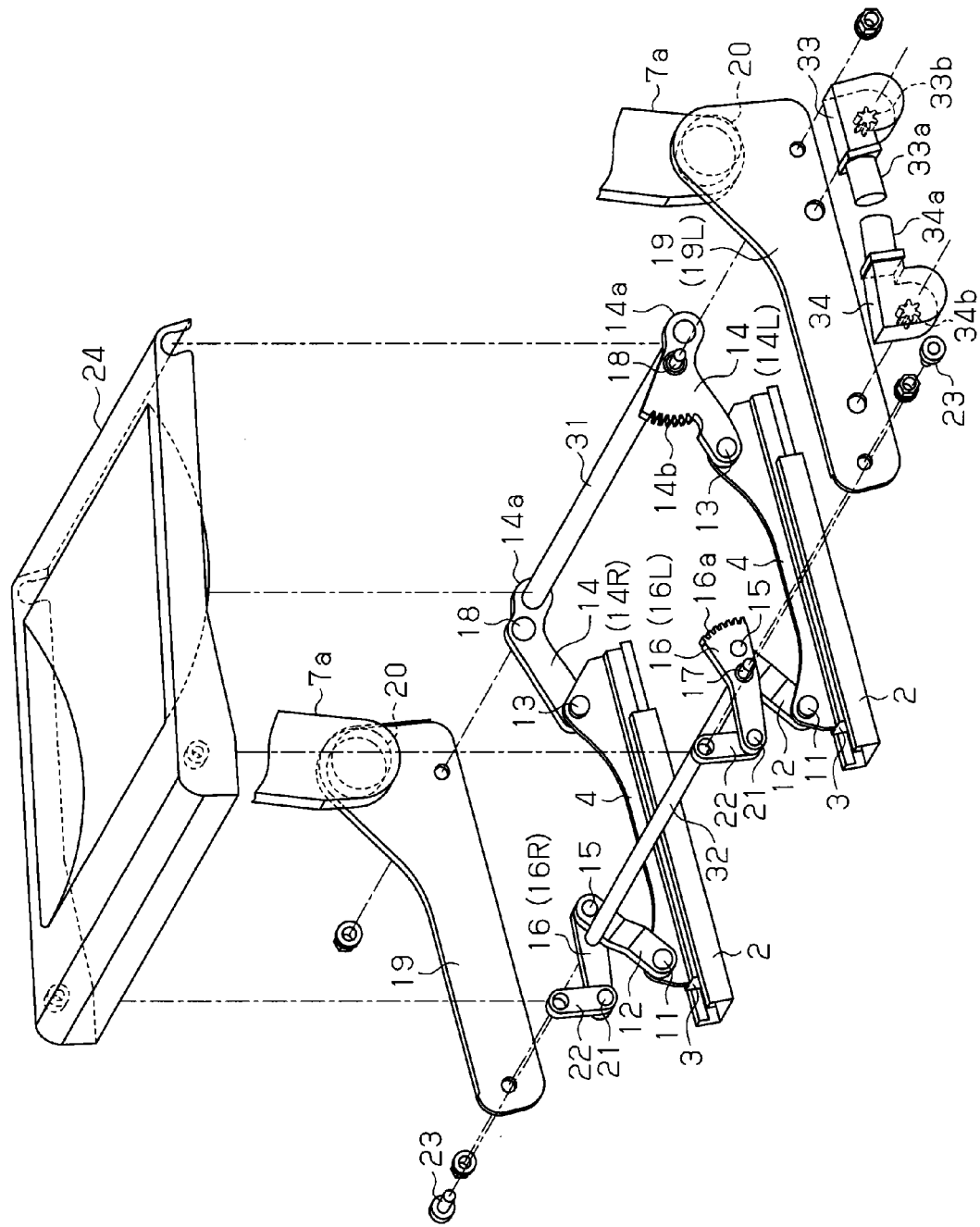
FIG. 3 is an exploded perspective view illustrating the seat lifter device of FIG. 1.

FIGS. 2 and 3 are plan view and exploded perspective view showing the framework of the seat main body 5. As shown in FIG. 3, one end (first end) of a front link 12 is rotationally coupled to the front section of each bracket 4 by a support shaft 11. One end (first end) of a rear link 14 is rotationally coupled to the rear section of each bracket 4 by a support shaft 13. The front links 12 and the rear links 14 extend rearward with respect to the associated support shafts 11, 13. One end (first end) of a tilt link 16 is rotationally coupled to the other end (second end) of each front link 12 by a support shaft 15. The tilt links 16 extend forward with respect to the support shafts 15.

The front section and the rear section of a lower arm 19 (frame member) are respectively rotationally coupled to the longitudinally middle portion of each tilt link 16 and the other end (second end) of each rear link 14 by support shafts 17, 18. The lower arms 19 form the framework of side portions of the seat cushion 6. Seat back frames 7a, which form the framework of the side portions of the seat back 7, are supported on the rear end portions of the lower arms 19 via reclining mechanisms 20.

Each rear link 14 has an extended portion 14a, which extends further rearward from the support shaft 13 (the coupling portion between the bracket 4 and the rear link 14) than the support shaft 18 (the coupling portion between the lower arm 19 and the rear link 14). The extended portions 14a are respectively secured to end portions of a beam member extending in the seat widthwise direction, which is a rear coupling rod 31 in the first embodiment. The support shafts 17 are respectively secured to the end portions of a front coupling rod 32, which extends in the seat widthwise direction.

One end (first end) of a swing link 22 is rotationally coupled to the other end (second end) of each tilt link 16 by a support shaft 21. The swing links 22 extend upward with respect to the support shafts 21.

The front section of the cushion member, which is a cushion pan 24 in the first embodiment, is rotationally coupled to the other ends (second end) of the swing links 22 by support shafts 23. The cushion pan 24 is formed into a substantially square dish-like shape matching the substantially square shape formed by the lower arms 19 and the rear coupling rod 31. The rear portion of the cushion pan 24 is rotationally coupled to the rear coupling rod 31. The cushion pan 24 forms the framework of the seat cushion 6, and retains a seat cushion material.

The rear link 14 located on the left side when facing forward of the seat (hereinafter, referred to as a rear link 14L) includes a substantially sectorial gear portion, that is, a sector gear 14b, which widens toward the front about the support shaft 18. A rotation transmitting member, which is a lifter drive device 33 in the first embodiment, is secured to the outer surface of the lower arm 19 located on the left side when facing forward of the seat (hereinafter, referred to as a lower arm 19L). The lifter drive device 33 includes an electric motor 33a and a pinion 33b. The pinion 33b is rotated by the electric motor 33a via an appropriate speed reduction mechanism. The pinion 33b extends through the lower arm 19L and meshes with the sector gear 14b.

Thus, when the lifter drive device 33 is driven, the rear link 14L, which meshes with the pinion 33b of the sector gear 14b, acts to rotate about the support shaft 18. However, since the bracket 4 (the upper rail 3) cannot move in the vertical direction. As a result, the support shaft 18 moves vertically with respect to the support shaft 13 together with the rear portion of the lower arm 19L. When the lifter drive device 33 is stopped, the pinion 33b, which meshes with the sector gear 14b, is locked by the speed reduction mechanism. Thus, the lower arm 19L and the rear link 14L, which support the pinion 33b (the lifter drive device 33), are substantially integrated. At this time, the motion of the rear link 14L is transmitted to the rear link 14 located on the right side when facing forward of the seat (hereinafter referred to as a rear link 14R) via the rear coupling rod 31. Thus, the left and right rear links 14L, 14R are interlocked and rotated about the support shafts 13. The lifter drive device 33 constitutes the lifter mechanism 10.

The tilt link 16 located on the left side when facing forward of the seat (hereinafter, referred to as a tilt link 16L) includes a substantially sectorial gear portion, that is, a sector gear 16a, which widens toward the rear about the support shaft 17. A front tilt drive device 34 is secured to the outer surface of the lower arm 19L to be located forward of the lifter drive device 33. The front tilt drive device 34 includes an electric motor 34a and a pinion 34b, which is rotated by the electric motor 34a via an appropriate speed reduction mechanism. The pinion 34b extends through the lower arm 19L and meshes with the sector gear 16a.

Therefore, when the front tilt drive device 34 is driven, the tilt link 16L, which meshes with the pinion 34b at the sector gear 16a, acts to rotate about the support shaft 17. However, the front link 12, which is coupled to the bracket 4 (the upper rail 3) cannot move in the vertical direction. As a result, the support shaft 17 moves vertically with respect to the support shaft 15 together with the swing link 22 and the front section of the lower arm 19L. When the front tilt drive device 34 is stopped, the pinion 34b, which is meshed with the sector gear 16a, is locked by the speed reduction mechanism. Thus, the lower arm 19L and the tilt link 16L, which support the pinion 34b (the front tilt drive device 34), are substantially integrated. At this time, the motion of the tilt link 16L is transmitted to the tilt link 16 located on the right side when facing forward of the seat (hereinafter, referred to as a tilt link 16R) via the front coupling rod 32. Thus, the left and right tilt links 16L, 16R are interlocked and rotated about the support shafts 15. The front tilt drive device 34 constitutes a tilt mechanism 30.

The operation of the seat lifter device according to the first embodiment will now be described with reference to FIGS. 4 to 6.

First, the operation of the lifter mechanism 10 will be described on the assumption that the front tilt drive device 34 is stopped, and the tilt link 16 and the swing link 22 are substantially integrated with the lower arm 19, which supports the front tilt drive device 34. At this time, the bracket 4 (the upper rail 3), the front link 12, the rear link 14, and the lower arm 19 configure a quadric crank chain that uses the lower arm 19 as a connector (connecting link). Also, the bracket 4 (the upper rail 3), the front link 12, the rear link 14, and the cushion pan 24 configure a quadric crank chain that uses the cushion pan 24 as a connector.

Figure 4:
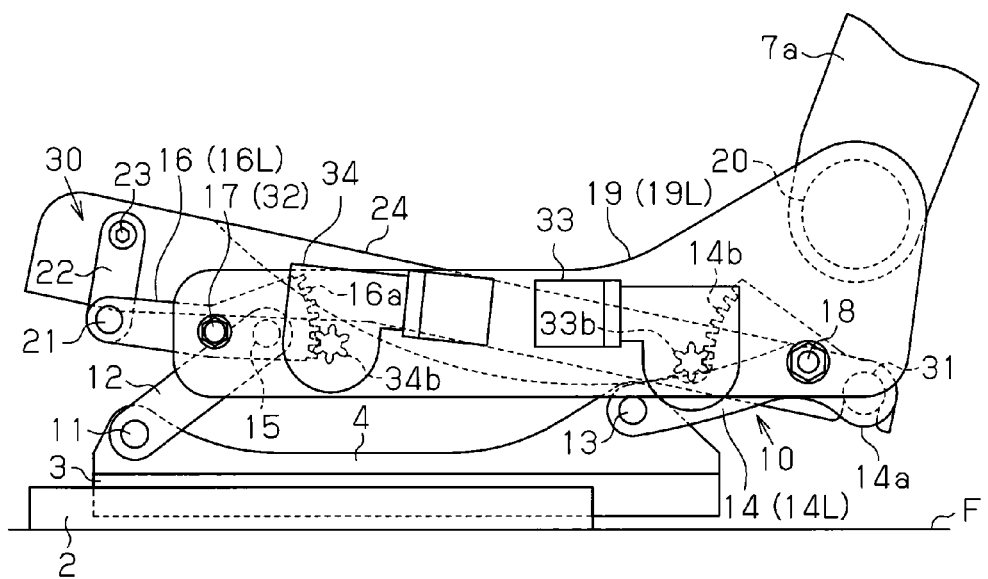
FIG. 4 is a side view illustrating operation of the seat lifter device of FIG. 1.

When the lifter drive device 33 is driven, and the pinion 33b is rotated in the clockwise direction in FIG. 4, the rear link 14 (14L) that acts to rotate about the support shaft 18 is pressed by the bracket 4 (the upper rail 3). Thus, the rear link 14 is rotated in the counterclockwise direction about the support shaft 13 as shown in FIG. 4. Interlocking with this, the front link 12 is rotated in the counterclockwise direction about the support shaft 11 as shown in FIG. 4. Thus, the support shafts 17, 18, which are arranged rearward of the support shafts 11, 13, respectively move upward, and the lower arm 19 moves substantially upward as shown in FIG. 5. Simultaneously, the seat back frames 7a (the seat back 7), which are supported on the rear end portion of the lower arms 19 via the reclining mechanisms 20, also move upward.

As the front links 12 and the rear links 14 rotate, the cushion pan 24 moves substantially upward. The rear coupling rod 31, which couples the rear portion of the cushion pan 24 and the rear links 14 to each other, is arranged rearward of the support shafts 18, which couple the lower arms 19 and the rear links 14 to each other. That is, the distance between the rear coupling rod 31 and the support shafts 13 is greater than the distance between the support shafts 18 and the support shafts 13. Thus, the cushion pan 24 is moved upward by a greater amount than the lower arms 19 by an amount corresponding to the difference between the distances.

Figure 5:
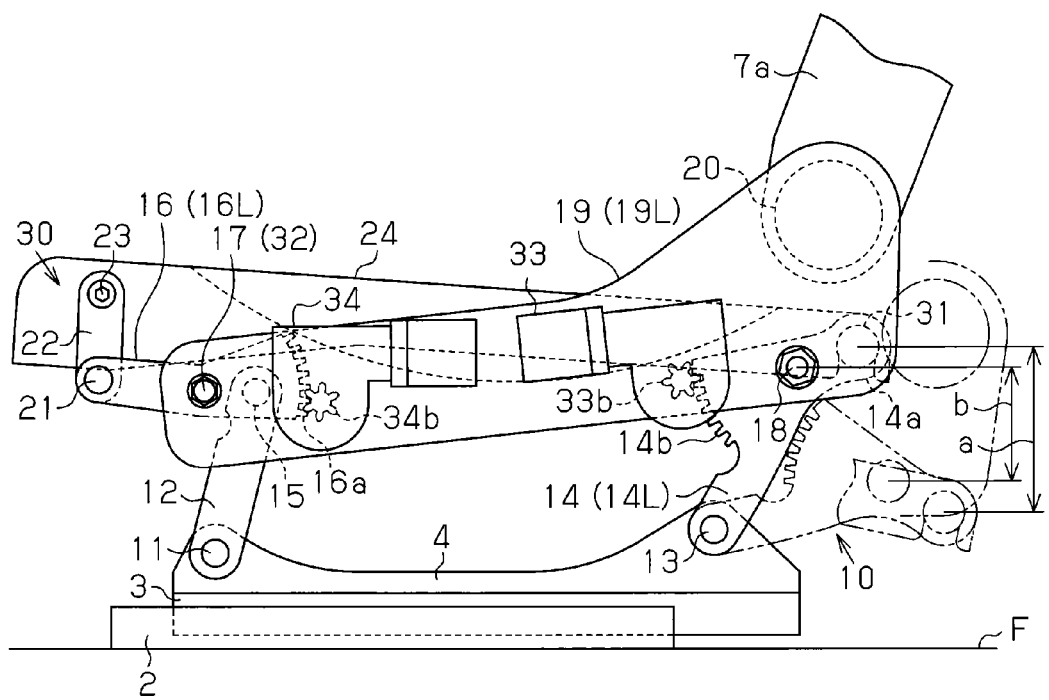
FIG. 5 is a side view illustrating operation of the seat lifter device of FIG. 1.

That is, as shown in FIG. 5, when the movement distance of the rear portion of the cushion pan 24 and the movement distance of the lower arms 19 associated with the rotation of the front links 12 and the rear links 14 are represented by A and B, the relationship is given as follows:
Movement Distance B of Lower Arm<Movement Distance A of Rear Portion of Cushion Pan.

When the lifter drive device 33 is driven in the reverse direction, and the pinion 33b is rotated in the counterclockwise direction in FIG. 5, the rear link 14 (14L), which acts to rotate about the support shaft 18, is pulled by the bracket 4 (the upper rail 3). Thus, the rear link 14 rotates about the support shaft 13 in the clockwise direction. Interlocking with this, the front link 12 rotates in the clockwise direction about the support shaft 11. Accordingly, the support shafts 17, 18, which are arranged rearward of the support shafts 11, 13, respectively move downward, and the lower arms 19 move substantially downward. Simultaneously, the seat back frames 7a (the seat back 7) also move downward.

As the front links 12 and the rear links 14 rotate, the cushion pan 24 also moves substantially downward. The rear section of the cushion pan 24 moves downward by an amount that is larger than the amount by which the lower arms 19 moves, and the difference in the moved amounts corresponds to the aforementioned difference in the distance.

Through adjustment of the vertical position of the seat main body 5 by the lifter mechanism 10, the distance between the cushion pan 24 and the reclining mechanisms 20 changes. The distance is reduced when the vertical position of the seat main body 5 moves upward. In contrast, the distance is increased when the vertical position of the seat main body 5 moves downward as the lifter mechanism 10 performs adjustment. In other words, even if the cushion pan 24 (the seat cushion 6) is moved upward by a large amount, the upward movement of the lower arms 19 (the seat back 7) is limited as compared to that of the cushion pan 24 (the seat cushion 6). Even if the cushion pan 24 (the seat cushion 6) is moved downward by a large amount, the downward movement of the lower arms 19 (the seat back 7) is limited as compared to that of the cushion pan 24 (the seat cushion 6).

As described above, the lifter mechanism 10 of the first embodiment limits the vertical movement of the seat back 7 even when the seat cushion 6 is moved vertically by a large amount to adjust the position of an eye level of the seat occupant.

The operation of the tilt mechanism 30 will now be described on the assumption that the lifter drive device 33 is stopped. At this time, the tilt link 16, the lower arm 19, the swing link 22, and the cushion pan 24 configure a quadric crank chain that uses the swing link 22 as the connector.

When the front tilt drive device 34 is driven, and the pinion 34b is rotated in the counterclockwise direction in FIG. 5, the tilt link 16 (16L) acts to rotate about the support shaft 17. As a result, the support shaft 17 moves upward with respect to the support shaft 15 together with the swing link 22 as shown in FIG. 6. Thus, the cushion pan 24 rotates about the rear coupling rod 31 in the clockwise direction, and the front section of the cushion pan 24 (the seat cushion 6) moves upward. At this time, the seat back frames 7a (the seat back 7), which are supported on the rear end portions of the lower arms 19 via the reclining mechanisms 20, are generally held stopped, and are retained at the current position.

Figure 6:
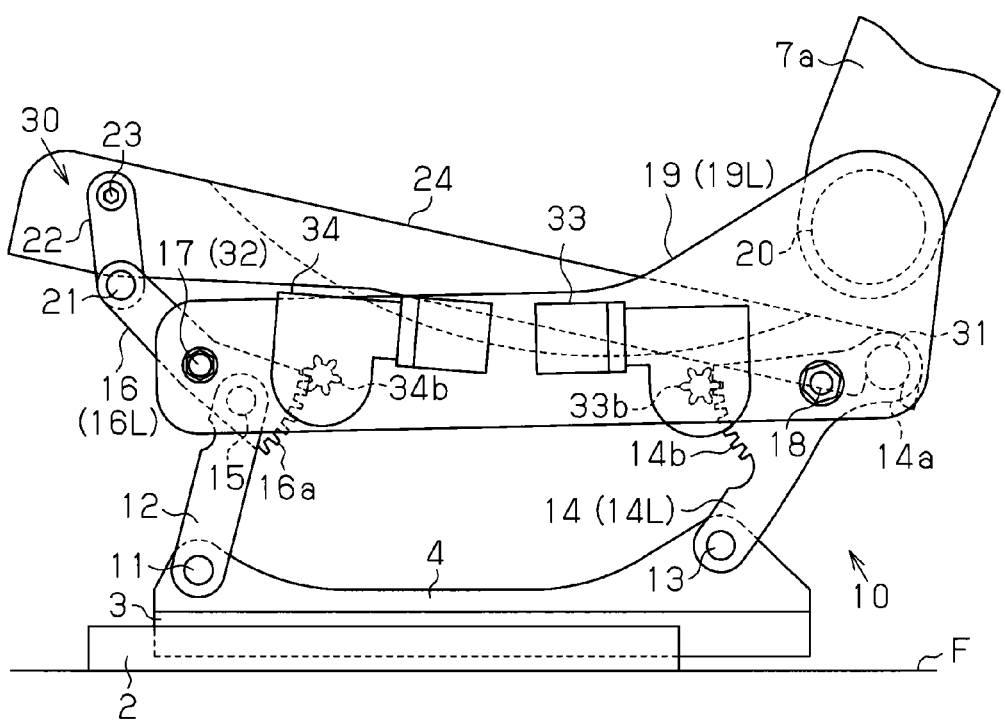
FIG. 6 is a side view illustrating operation of the seat lifter device of FIG. 1.

When the front tilt drive device 34 is driven in the reverse direction, and the pinion 34b is rotated in the clockwise direction in FIG. 6, the tilt link 16 (16L) acts to rotate about the support shaft 17. As a result, the support shaft 17 moves downward with respect to the support shaft 15 together with the swing link 22. Thus, the cushion pan 24 is rotated in the counterclockwise direction about the rear coupling rod 31, and the front section of the cushion pan 24 (the seat cushion 6) moves downward. At this time, the seat back frames 7a (the seat back 7), which are supported on the rear end portions of the lower arms 19 via the reclining mechanisms 20, are generally held stopped, and are retained at the current position.

Thus, the tilt mechanism 30 of the first embodiment allows only the vertical position of the front section of the seat cushion 6 to be adjusted while hardly moving the seat back 7.

As described above, the first embodiment has the following advantages.

(1) As the rear links 14 are rotated by the lifter drive device 33, the rear section of the lower arms 19 move up and down integrally with the seat back 7. The brackets 4, the rear section of the cushion pan 24, and the rear section of the lower arms 19 are respectively coupled to the rear links 14 via the support shafts 13, the rear coupling rod 31, and the support shafts 18. The rear coupling rod 31 is further from the support shafts 13 than the support shafts 18, and thus, the rear section of the cushion pan 24 moves vertically by a greater amount than the rear section of the lower arms 19. Thus, for example, even if a small person moves the cushion pan 24 (the seat cushion 6) upward by a large amount, the upward movement of the seat back 7 is limited as compared to that of the cushion pan 24 (the seat cushion 6). This allows the S-curve of the back and the S-curve of the seat back to be matched. If a large person moves the cushion pan 24 (the seat cushion 6) downward by a large amount, the downward movement of the seat back 7 is limited as compared to that of the cushion pan 24 (the seat cushion 6). This allows the S-curve of the back and the S-curve of the seat back 7 to be matched in the same manner.

Also, since the possible adjustment amount of the lower arms 19 in the vertical direction is reduced as compared to that of the rear section of the cushion pan 24, the lengths of the front links 12 and the rear links 14 do not need to be increased. Thus, the required strength and rigidity of the front links 12 and the rear links 14 are reduced, and the mass of the front links 12 and the rear links 14 is reduced. Furthermore, a gap between the headrest 8 retained at the upper end of the seat back 7 and the ceiling is sufficiently ensured.

(2) The rear coupling rod 31 is secured to the rear links 14 so as to extend between the rear links 14. The rear section of the cushion pan 24 (the seat cushion 6) is coupled to the rear links 14 via the rear coupling rod 31. Thus, the rear section of the cushion pan 24 (the seat cushion 6) is further firmly coupled to the rear links 14.

(3) The cushion pan 24 solely supports the weight of the seat occupant applied to the seat surface. Thus, the structure of the cushion pan 24 is significantly simplified.

(4) The tilt mechanism 30 tilts the front section of the cushion pan 24 using the rear section of the cushion pan 24 as a fulcrum, and further finely adjusts the seat position as desired. In particular, since the vertical movement of the front section of the cushion pan 24 is ensured to be greater than that of the lower arms 19, the vertical movement of the front section of the seat cushion 6 is increased without increasing the vertical movement of the lower arms 19 (the reclining mechanisms 20, the seat back 7) moved by the lifter mechanism 10. Thus, the change amount of the seat surface angle is increased.

(5) The vertical movement of the lower arms 19 is reduced as compared to the vertical movement of the rear section of the cushion pan 24. Thus, even if the rear section of the cushion pan 24 is moved upward by a large amount, a vertical gap between the lower arms 19 and the brackets 4 (the seat rails) is kept small. Thus, a protector for preventing entry of hands and foots in the gap is omitted.

Second Embodiment

A second embodiment of the present invention will be described with reference to the drawings. In the second embodiment, the structure of the cushion member coupled to the lower arms 19 is mainly modified from that of the first embodiment. The detailed descriptions of the similar parts are omitted.

Figure 7:
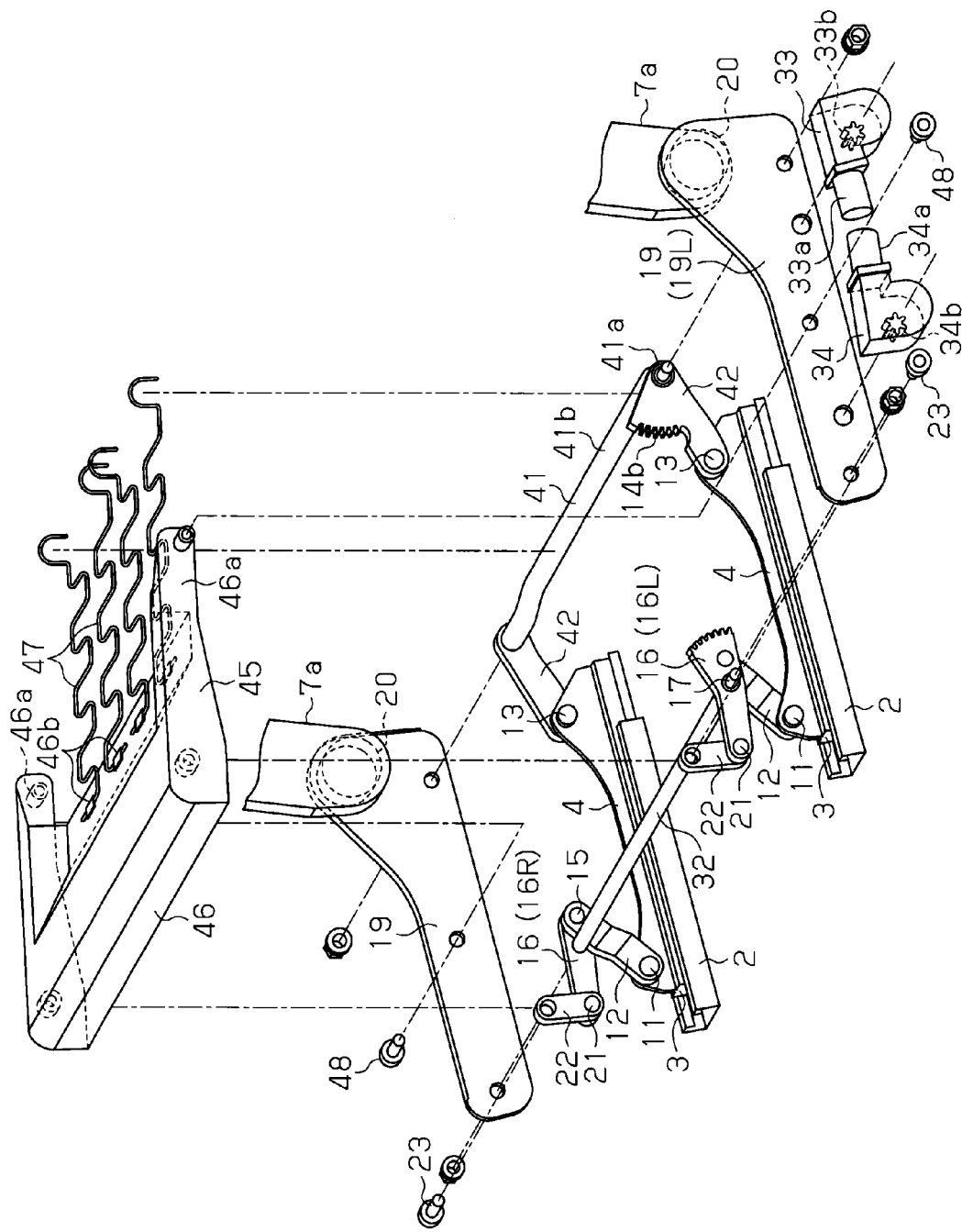
FIG. 7 is an exploded perspective view illustrating a seat lifter device according to a second embodiment of the present invention.
Figure 8:
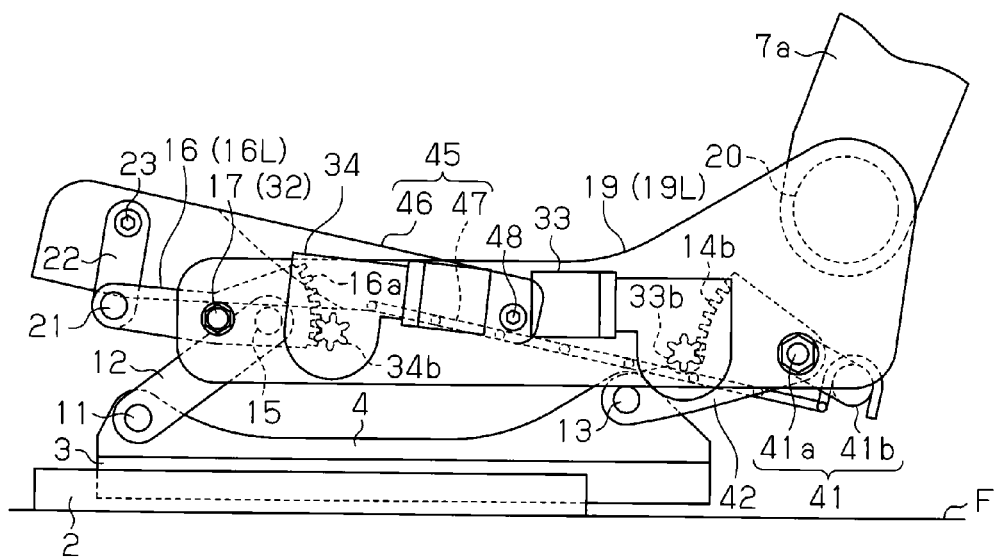
FIG. 8 is a side view illustrating the operation of the seat lifter device of FIG. 7.

FIGS. 7 and 8 are an exploded perspective view and a side view illustrating the framework of the seat main body 5. As shown in the drawings, a beam member of the second embodiment, which is a rear side coupling rod 41, integrally includes a pair of shaft portions 41a and an eccentric portion 41b. The shaft portions 41a are arranged on the end portions of the rear side coupling rod 41. The eccentric portion 41b has an axis that is translated from the axis of the shaft portions 41a and connects the shaft portions 41a. The shaft portions 41a are respectively secured to the rear end portions of the rear links 42, and are rotationally coupled to the rear portions of the lower arms 19. The eccentric portion 41b is arranged further rearward from the support shafts 13 (the coupling portions between the brackets 4 and the rear links 42) than the shaft portions 41a (the coupling portions between the lower arms 19 and the rear links 42). The structure of the rear links 42 of the second embodiment is similar to that of the first embodiment except that the extended portions (14a) are omitted.

Also, a cushion member 45 including a cushion pan 46 and spring members, which are S-springs 47, is used in the second embodiment instead of the cushion pan 24. The cushion pan 46 forming the front portion of the cushion member 45 is formed into a substantially square dish-like shape, and includes a pair of mounting pieces 46a, which extend rearward from both ends in the seat widthwise direction. The rear portion of the cushion pan 46 is rotationally coupled to the longitudinally middle portions of the lower arms 19 (the portion sandwiched between the support shaft 17 and the shaft portion 41a) via the mounting pieces 46a with support shafts 48. The front section of the cushion pan 46 is rotationally coupled to the other ends (second end) of the swing links 22 by the support shafts 23.

The S-springs 47 forming the rear portion of the cushion member 45 extend in the fore-and-aft direction while being bent and arranged side by side in the seat widthwise direction. The front ends of the S-springs 47 are engaged with engaging portions 46b arranged on the rear end of the cushion pan 46. The rear ends of the S-springs 47 are rotationally engaged with the eccentric portion 41b of the rear side coupling rod 41. That is, the S-springs 47 are coupled to the eccentric portion 41b, which is arranged further rearward from the support shafts 13 (the coupling portions between the brackets 4 and the rear links 42) than the shaft portions 41a (the coupling portions between the lower arms 19 and the rear links 42).

The operation of the seat lifter device of the second embodiment will now be described with reference to FIG. 9.

First, the operation of the lifter mechanism 10 will be described on the assumption that the front tilt drive device 34 is stopped, and the tilt link 16 and the swing link 22 are substantially integrated with the lower arm 19 that supports the front tilt drive device 34. At this time, the bracket 4 (the upper rail 3), the front link 12, the rear link 42, and the lower arm 19 configure a quadric crank chain that uses the lower arm 19 as the connector (connecting link).

When the lifter drive device 33 is driven and the pinion 33b is rotated in the clockwise direction in FIG. 8, the rear link 42 that acts to rotate about the shaft portion 41a is pressed by the associated bracket 4 (upper rail 3). Thus, as shown in FIG. 9, the lower arm 19 moves substantially upward in the same manner as described above. Simultaneously, the seat back frames 7a (seat back 7), which are supported on the rear end portions of the lower arms 19 via the reclining mechanisms 20, also move upward.

As the front links 12 and the rear links 42 are rotated, the cushion member 45 also moves substantially upward. The eccentric portion 41b, which couples the rear end portions of the S-springs 47 and the rear links 14 to each other, is arranged rearward of the shaft portions 41a, which couple the lower arms 19 and the rear links 14. That is, the distance between the eccentric portion 41b and the support shafts 13 is greater than the distance between the shaft portions 41a and the support shafts 13. Therefore, the cushion member 45 moves upward by a greater amount than the lower arms 19 by an amount corresponding to the difference between the distances.

Figure 9:
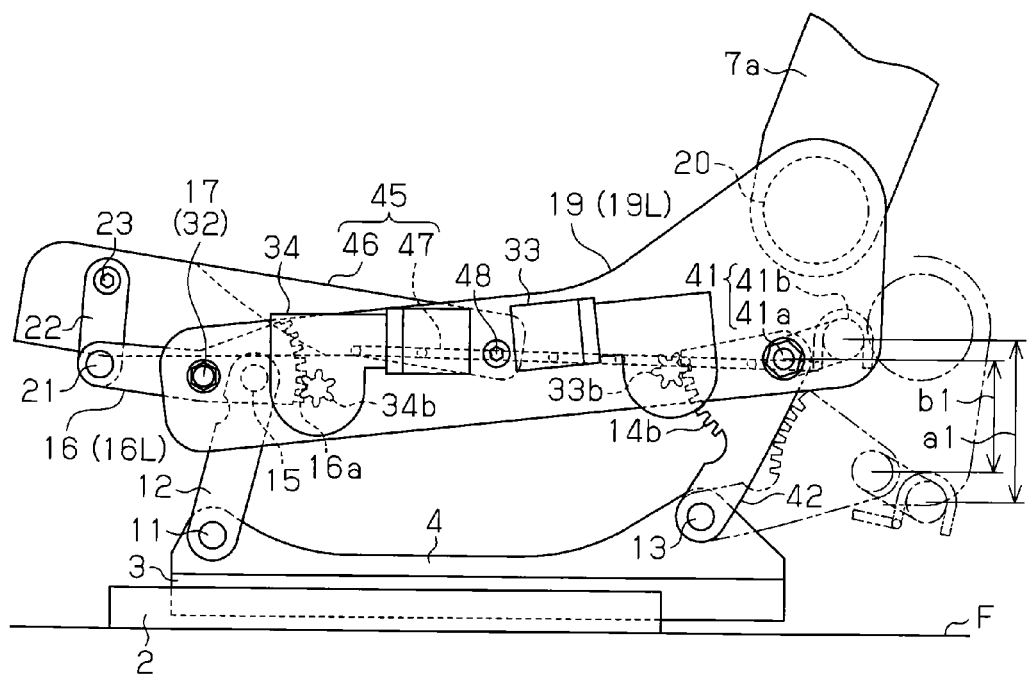
FIG. 9 is a side view illustrating the operation of the seat lifter device of FIG. 7.

That is, as shown in FIG. 9, when the movement distance of the rear ends of the S-springs 47 and the movement distance of the lower arms 19 associated with rotation of the front links 12 and the rear links 42 are respectively represented by A1 and B1, the relationship is given as follows:

Movement Distance B1 of Lower Arms<Movement Distance A1 of Rear End Portions of S-springs In other words, even if the cushion member 45 (the seat cushion 6) is moved upward by a large amount, the upward movement of the lower arms 19 (the seat back 7) is limited as compared to that of the cushion member 45 (the seat cushion 6). The positional displacement of the rear ends of the S-springs 47 with respect to the cushion member 45 is absorbed by the elastic deformation of the S-springs 47.

When the lifter drive device 33 is driven in the reverse direction, and the pinion 33b is rotated in the counterclockwise direction in FIG. 9, the rear link 42 that acts to rotate about the shaft portion 41a is pulled by the bracket 4 (the upper rail 3). Thus, the lower arm 19 moves substantially downward in the same manner as described above. Simultaneously, the seat back frames 7a (the seat back 7) also moves downward.

As the front links 12 and the rear links 42 are rotated, the cushion member 45 also moves substantially downward. The rear ends of the S-springs 47 move downward by an amount that is larger than the amount by which the lower arms 19 moves, and the difference in the moved amounts corresponds to the aforementioned distance difference. In other words, even if the cushion member 45 (the seat cushion 6) is moved downward by a large amount, the downward movement of the lower arms 19 (the seat back 7) is limited as compared to that of the cushion member 45 (the seat cushion 6). The positional displacement of the rear ends of the S-springs 47 with respect to the cushion member 45 is absorbed by the elastic deformation of the S-springs 47.

As described above, even when the seat cushion 6 is vertically moved by a large amount to adjust the position of the eye level of the seat occupant, the vertical movement of the seat back 7 is limited.

The operation of the tilt mechanism 30 will now be described on the assumption that the lifter drive device 33 is stopped. At this time, the tilt link 16, the lower arm 19, the swing link 22, and the cushion pan 46 configure a quadric crank chain that uses the swing link 22 as the connector.

When the front tilt drive device 34 is driven, and the pinion 34b is rotated in the counterclockwise direction in FIG. 9, the tilt link 16 (16L) acts to rotate about the support shaft 17. As a result, the support shaft 17 moves upward with respect to the support shaft 15 together with the swing link 22. Accordingly, the cushion pan 46 rotates in the clockwise direction about the support shaft 48, and the front section of the cushion pan 46 (the seat cushion 6) moves upward. At this time, the seat back frames 7a (the seat back 7), which are supported on the rear end portions of the lower arms 19 via the reclining mechanisms 20, are generally held stopped, and are retained at the current position.

When the front tilt drive device 34 is driven in the reverse direction, and the pinion 34b is rotated in the clockwise direction, the tilt link 16 (16L) acts to rotate about the support shaft 17. As a result, the support shaft 17 moves downward with respect to the support shaft 15 together with the swing link 22. Accordingly, the cushion pan 46 rotates in the counterclockwise direction about the support shaft 48, and the front section of the cushion pan 46 (the seat cushion 6) moves downward. At this time, the seat back frames 7a (the seat back 7), which are supported on the rear end portions of the lower arms 19 via the reclining mechanisms 20, are generally held stopped, and are retained at the current position.

As described above, only the vertical position of the front section of the seat cushion 6 is adjusted while slightly moving the seat back 7. In particular, the rotational center (the support shaft 48) of the cushion pan 46 is arranged closer to the support shaft 23 as compared to the rotational center (the rear coupling rod 31) of the cushion pan 24 of the first embodiment. Thus, for the same rotation amount of the tilt link 16, the front section of the cushion pan 46 (seat cushion 6) is vertically moved by a larger amount as compared to that of the first embodiment.

As described above, the second embodiment has the following advantages in addition to the advantages (1), (2), (4), and (5) of the first embodiment.

(6) The rear side coupling rod 41 (the beam member) is used both as the coupling portion (the shaft portions 41a) between the rear links 42 and the lower arms 19, and also as the coupling portion (the eccentric portion 41b) between the rear links 42 and the rear section of the cushion member 45. Thus, the number of components is reduced. The rear side coupling rod 41 is easily formed by simply bending the conventional rear side coupling rod to couple the S-springs 47.

(7) Since the cushion member 45 including the cushion pan 46 and the S-springs 47 is employed, the weight of the seat occupant applied to the seat surface is supported by both the cushion pan 46 and the S-springs 47.

The above described embodiments may be modified as follows.

In the first embodiment, the rear section of the lower arms 19 and the rear section of the cushion pan 24 may be respectively coupled to the shaft portions 41a and the eccentric portion 41b of the rear side coupling rod 41 as in the second embodiment.

In the second embodiment, the rear section of the lower arms 19 and the rear end portions of the S-springs 47 may be respectively coupled to the support shafts 18 and the rear coupling rod 31 as in the first embodiment.

In each of the above embodiments, an operating knob, which serves as a rotation transmitting member that transmits the operating force for rotating the rear link 14 (14L), may be employed instead of the lifter drive device 33.

In each of the above embodiments, the lifter drive device 33 (or the above-mentioned operating knob) may rotate the front link 12 instead of the rear link 14 (14L) to vertically move the lower arms 19.

In each of the above embodiments, the tilt mechanism 30 may be omitted.

The invention claimed is:

1. A seat lifter device comprising:
    a seat support member;
    a front link including first and second ends, the first end being rotationally coupled to a front section of the seat support member;
    a rear link including first and second ends, the first end being rotationally coupled to a rear section of the seat support member;
    a frame member including a front section rotationally coupled to the second end of the front link and a rear section rotationally coupled to the second end of the rear link at a position rearward of the coupling portion between the seat support member and the rear link, wherein a seat back is supported at a rear end portion of the frame member;
    a cushion member including part of a seat cushion, the cushion member including a front section rotationally coupled to the frame member and a rear section rotationally coupled to the rear link at a position further separated from the coupling portion between the seat support member and the rear link than the coupling portion between the rear link and the frame member; and
    a rotation transmitting member for rotating one of the front link and the rear link.

2. The seat lifter device according to claim 1, wherein
the rear link is one of a pair of rear links facing each other in a seat widthwise direction,
the seat lifter device further comprises a beam member, the beam member including a pair of shaft portions, which are secured to the rear links and provide the coupling portions between the rear links and the frame member, and an eccentric portion, which has an axis displaced from the axis of the shaft portions and extends between the shaft portions, and
the rear section of the cushion member is rotationally coupled to the rear links via the eccentric portion.

3. The seat lifter device according to claim 1, wherein
the rear link is one of a pair of rear links facing each other in a seat widthwise direction,
the seat lifter device further comprises a beam member, which extends in the seat widthwise direction and is secured to the rear links, the beam member having an axis that extends through a pair of coupling portions between the rear section of the cushion member and the rear links, and
the rear section of the cushion member is rotationally coupled to the rear links via the beam member.

4. The seat lifter device according to claim 2, wherein the cushion member includes:
a cushion pan rotationally coupled to the frame member, the cushion pan forming the front section of the cushion member; and
a spring member forming the rear section of the cushion member, the spring member including a front end portion engaged with the cushion pan and a rear end portion rotationally engaged with the beam member.

5. The seat lifter device according to claim 3, wherein the cushion member is a cushion pan, and the rear section of the cushion pan is rotationally coupled to the beam member.

6. The seat lifter device according to claim 1, further comprising a tilt mechanism that vertically moves the front section of the cushion member with respect to the rear section of the cushion member, wherein the front section of the cushion member is coupled to the frame member via the tilt mechanism.

* * * * *